J. Rikard Uddenborg,
Inventor

Sept. 10, 1929.   J. R. UDDENBORG   1,727,456
WINDSHIELD WIPER
Filed March 30, 1928   2 Sheets-Sheet 2
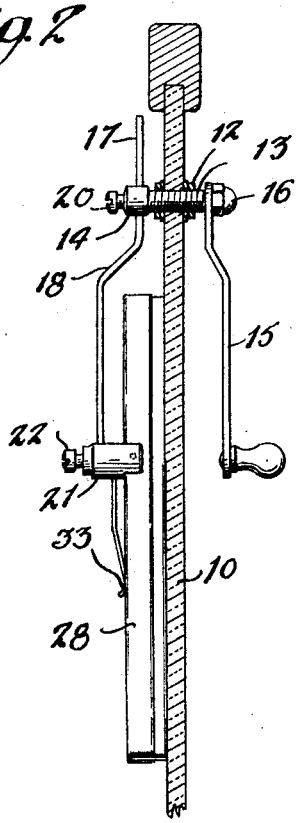
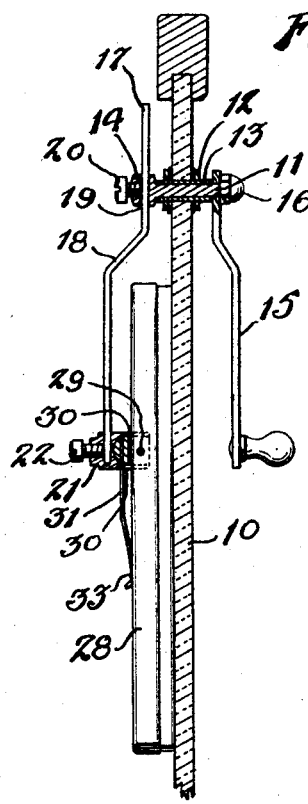
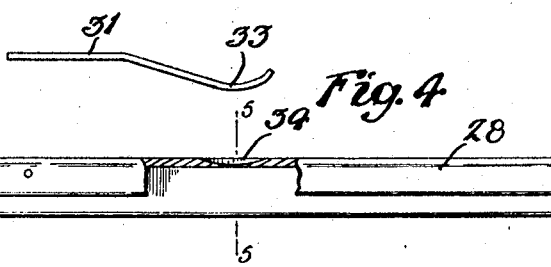
J. Rikard Uddenborg.
Inventor
By Wm. L. Symons
Attorney Patented Sept. 10, 1929.

1,727,456

UNITED STATES PATENT OFFICE.

JOHAN RIKARD UDDENBORG, OF CHICAGO, ILLINOIS, ASSIGNOR OF ONE-HALF TO AXEL V. HALL, OF CHICAGO, ILLINOIS.

WINDSHIELD WIPER.

Application filed March 30, 1928. Serial No. 265,947.

My invention relates to improvements in cleaners for windows or the like and more particularly to windshield wipers for vehicles.

An important object of my invention is the provision of a device of this character which will clean snow or water from a windshield or the like without allowing it to pile up in front of the wiper.

A further object of my invention is to provide a device of the above-mentioned character which is simple of construction, inexpensive to manufacture, strong and durable.

Other objects and advantages of my invention will be apparent during the course of the following description.

Figure 1:
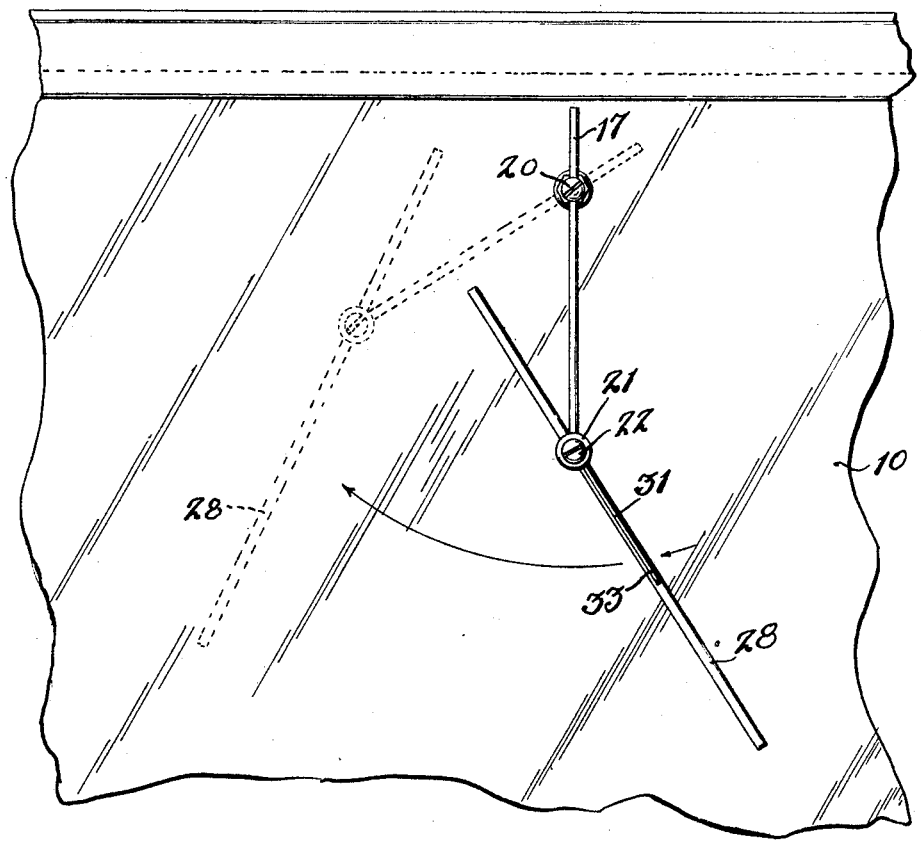
Figure 6:
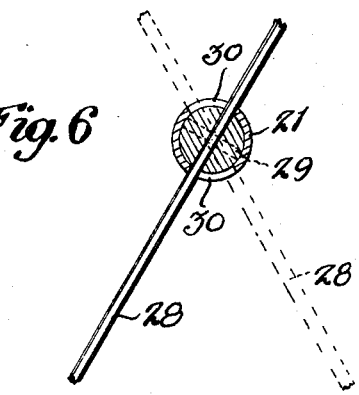
Figure 7:
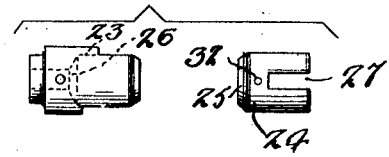

In the accompanying drawings which form a part of this specification and wherein like characters of reference denote like or corresponding parts throughout the same, Figure 1 is a front elevation of a portion of a windshield with my improved wiper applied thereto, Figure 2 is a vertical sectional view therethrough, Figure 3 is a view similar to Figure 2, portions of the wiper being shown in section, Figure 4 is a fragmentary view of the squeegee or wiper element, parts being shown in section, with the spring presser arm, Figure 5 is a sectional view taken on the line 5—5 of Figure 4, Figure 6 is a sectional view through the wiper carrier showing its relation to the wiper, and, Figure 7 is a detail view of the carrier elements.

In the drawings wherein for the purpose of illustration is shown a preferred embodiment of my invention, the numeral 10 designates a windshield of a vehicle having a shaft 11 secured thereto by means of securing members 12 engaging a screw threaded sleeve 13. The outer end of the shaft 11 is provided with an enlarged head 14. and its inner end is provided with a screw threaded portion adapted to receive a handle member 15, held in place by a suitable nut 16. While I have shown a hand operated wiper extending through the windshield, it is to be understood that my invention is not restricted to any particular form of operating or securing means but is applicable to any type of wiper, hand or power operated, and secured to the windshield in any suitable manner. A wiper arm 17 is offset outwardly at 18 and has its upper end passed through a slot 19 in the head 14, and adjustably locked therein by the set screw 20.

A carrying member 21 has a slot to receive the lower end of the arm 17 and a set screw 22 is arranged in the end of the carrier 21 and engages the arm 17. The carrier 21 is provided at its inner end with an open cylindrical socket 23 adapted to rotatably receive the wiper carrying slotted plug 24. The end of the slotted plug is tapered at 25 and engages the tapered seat 26 in the end of the socket, which communicates with the set screw openings. The space 27 in the slot of the plug receives the wiper element or squeegee 28 and a pin 29 extends through the plug and wiper closer to the upper end of the wiper than the lower end thereof as shown in Figure 1.

The carrier 21 is provided with enlarged diametrically opposed slots 30 opening into the socket 23 and adapted to receive the wiper element. A spring member 31 is received in an opening 32 in the plug 24 above the slot 27 and extends through the lower slot 30 in spaced relation to the wiper element. The end of the spring 31 is bent to form an offset curved portion 33 which fits within a narrow arcuate depression or slit 34 in the edge of the wiper 28.

It will be seen that the wiper element and its carrying plug will be free to rotate for the width of the slots 30 as shown in Figure 6, and that the spring 31 will press the wiper firmly against the windshield. The pin 29 and arcuate slit 34 are arranged on opposite sides of the center of the wiper element, and are preferably substantially equally spaced therefrom to preserve the proper balance or level of the wiper.

The wiper being connected to the carrier at a point closer to its upper end than its lower end will be moved as shown in Figure 1, with its lower end trailing behind the upper end, with the result that the water or snow on the windshield will be forced downwardly, and not upwardly, by the wiper element on its upward stroke. When the direction of the wiper is reversed, the slots 30 allow the position of the wiper to be reversed in an obvious manner, and the same effect will be obtained on the return stroke.

While I have shown and described the preferred embodiment of my invention, it is to be understood that various changes in the size, shape and arrangement of parts may be resorted to which come within the spirit of my invention and the scope of the subjoined claims.

Having thus described my invention, what I claim and desire to protect by Letters Patent is:

1. A device of the character described comprising a pivotally mounted arm, a wiper pivotally secured to the arm at a point spaced from the center of the wiper, means to limit rotational movement of the wiper and a spring arm secured to the pivoted arm and adapted to move with the wiper, said spring arm engaging the wiper at a point spaced from the center of the wiper on the opposite side of the center from the connection between the wiper and the pivotally mounted supporting arm.

2. A device of the character described comprising a movable arm, a wiper pivotally secured thereto at a point spaced from the center of the wiper, and a spring member secured to the arm to move with the wiper, said spring member engaging the wiper at a point spaced from the center of the wiper on the opposite side of the center from the connection between the wiper and the movable arm.

3. A device of the character described comprising a movable arm, a carrier rigidly secured to said arm and having a socket therein, a slotted plug rotatably arranged in said socket, and a wiper secured in the slot of said plug at a point closer to one end of the wiper than to the other, the carrier having enlarged slots to receive the wiper and allow limited rotation thereof.

4. A device of the character described comprising a movable arm, a carrier rigidly secured thereto, and having a socket therein, a slotted plug rotatably arranged in said socket, a wiper secured in the slot of said plug at a point spaced from the center of the wiper, and a spring member carried by said plug and engaging the wiper at a point spaced from the center of the wiper on the opposite side thereof.

5. A device of the character described comprising a movable arm, a carrier secured thereon and having a socket therein, a rotatable member arranged therein, a wiper secured to the rotatable member at a point spaced from the center of the wiper and having a depression at a point spaced from the center on the opposite side thereof, means to limit rotational movement of the wiper, and a spring member secured to said rotatable member and engaging the depression in the wiper.

6. A device of the character described comprising a movable arm, a carrier rigidly secured to said arm and having a socket therein, a slotted plug rotatably arranged in said socket, and a wiper element secured in the slot of said plug, the carrier having slots to receive the wiper and to allow limited rotation thereof.

In testimony whereof I affix my signature.

JOHAN RIKARD UDDENBORG.